(12) United States Patent
Baudart et al.

(10) Patent No.: US 10,359,644 B2
(45) Date of Patent: Jul. 23, 2019

(54) METHOD FOR OPTIMIZING THE POSITION OF AN OPTICAL LENS IN A LENS BLANK

(71) Applicant: ESSILOR INTERNATIONAL (COMPAGNIE GENERAL D'OPTIQUE), Charenton-le-Pont (FR)

(72) Inventors: Thierry Baudart, Charenton-le-Pont (FR); Florence Morel, Charenton-le-Pont (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 318 days.

(21) Appl. No.: 15/507,603

(22) PCT Filed: Sep. 23, 2015

(86) PCT No.: PCT/EP2015/071845
§ 371 (c)(1),
(2) Date: Feb. 28, 2017

(87) PCT Pub. No.: WO2016/050579
PCT Pub. Date: Apr. 7, 2016

(65) Prior Publication Data
US 2017/0242268 A1 Aug. 24, 2017

(30) Foreign Application Priority Data

Sep. 30, 2014 (EP) .................................. 14306533

(51) Int. Cl.
*G02C 7/02* (2006.01)
*B29D 11/00* (2006.01)
*B24B 13/005* (2006.01)

(52) U.S. Cl.
CPC .......... *G02C 7/028* (2013.01); *B24B 13/0055* (2013.01); *B29D 11/00009* (2013.01);
(Continued)

(58) Field of Classification Search
CPC .... G02C 7/028; G02C 7/02; B29D 11/00009; B29D 11/00019; B24B 13/0055
See application file for complete search history.

(56) References Cited

U.S. PATENT DOCUMENTS

| 5,150,547 A | 9/1992 | Johnson | |
|---|---|---|---|
| 2010/0112907 A1* | 5/2010 | Hasegawa | ................. B23B 5/36 451/42 |
| 2011/0257930 A1* | 10/2011 | Gourraud | .............. B24B 13/005 702/150 |

FOREIGN PATENT DOCUMENTS

| CA | 2 291 548 A1 | 12/2000 |
|---|---|---|
| EP | 2 093 018 A1 | 8/2009 |

(Continued)

OTHER PUBLICATIONS

International Search Report, dated Nov. 20, 2015, from corresponding PCT application.

*Primary Examiner* — Mathieu D Vargot
(74) *Attorney, Agent, or Firm* — Young & Thompson

(57) ABSTRACT

A method includes: providing lens blank data relating to the first, second and peripheral blank surfaces of the lens blank; providing optical lens data relating to the first, second and peripheral optical surfaces of the optical lens; virtually positioning the optical lens in the lens blank in a position so that at least one of the first optical surface or the second optical surface is included within the lens blank; evaluating a manufacturing prism cost function, the machining prism cost function corresponding to a weighed sum of the first manufacturing prism to be used when blocking the lens blank on the second surface to machine the first optical surface and of the second manufacturing prism to be used when blocking the lens blank on the first optical surface to machine the second optical surface. The positioning and
(Continued)

evaluation steps are repeated so as to minimize the manufacturing prism cost function.

20 Claims, 3 Drawing Sheets

(52) U.S. Cl.
CPC .......... *B29D 11/00019* (2013.01); *G02C 7/02* (2013.01); *G02C 2202/08* (2013.01)

(56) References Cited

FOREIGN PATENT DOCUMENTS

| WO | 99/52480 A1 | 10/1999 |
|---|---|---|
| WO | 2013/072249 A1 | 5/2013 |
| WO | 2014/013072 A1 | 1/2014 |

* cited by examiner

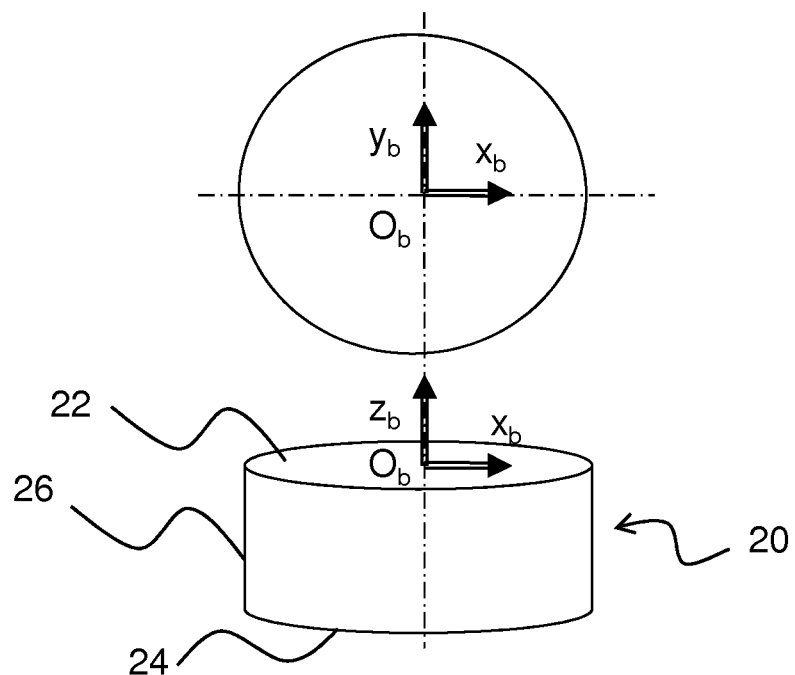
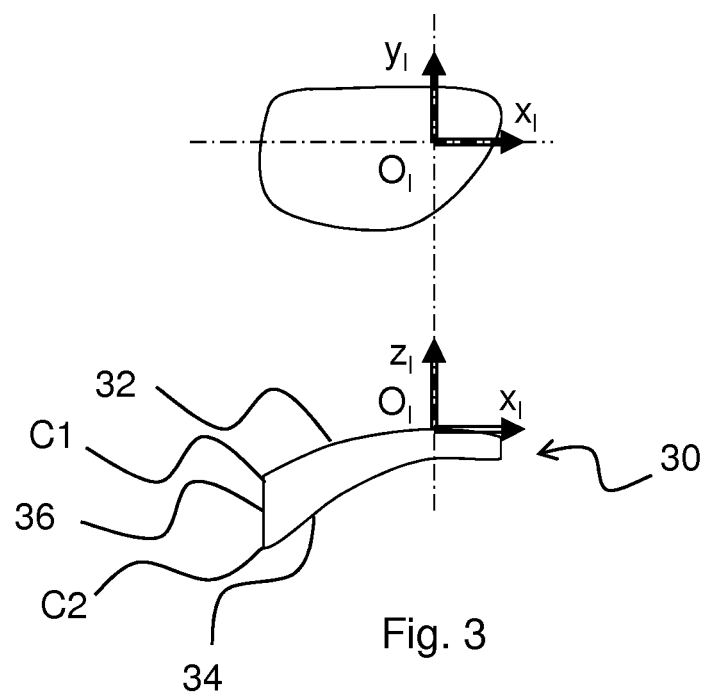
Fig. 2
Fig. 3

METHOD FOR OPTIMIZING THE POSITION OF AN OPTICAL LENS IN A LENS BLANK

The invention relates to a method for optimizing the position of an optical lens to be manufactured in a lens blank, the optical lens being manufactured by machining at least two surfaces of the lens blank. The invention further relates to a method for selecting a lens blank to be used to manufacture an optical lens and to a method of manufacturing an optical lens.

The discussion of the background of the invention herein is included to explain the context of the invention. This is not to be taken as an admission that any of the material referred to was published, known or part of the common general knowledge at the priority date of any of the claims.

An optical lens is generally manufactured in accordance with wearer specifications. In the case, for example, of an ophthalmic lens for the correction or improvement of eyesight, the ophthalmic lens is manufactured according to a wearer prescription corresponding to the visual requirements of that wearer. In addition, the shape and size of the spectacle frame supporting the ophthalmic lens is taken into account. At least one of the surfaces of the ophthalmic lens is processed to provide an ophthalmic lens according to the wearer prescription. The contour of the ophthalmic lens is edged according to the shape of the spectacle frame on which the ophthalmic lens is to be mounted.

An optical lens is generally manufactured from an optical lens blank such as a semi-finished lens blank. A semi-finished lens blank generally has two opposite surfaces at least one of which is unfinished.

The unfinished surface of the lens blank is machined according to the wearer's prescription to provide the required surface of the optical lens. An optical lens having finished back and front surfaces is often referred to as an uncut optical lens. The uncut optical lens is edged according to a shape of a spectacle frame of the optical lens in order to obtain an edged or cut optical lens.

According to further manufacturing processes an optical lens may be obtained by machining both surfaces of an optical lens blank.

With the increasing trend to larger and larger spectacle frames, for example wrap or shield style spectacle frames, the problem of producing optical lens from optical lens blank is more and more complex.

Figure 1:
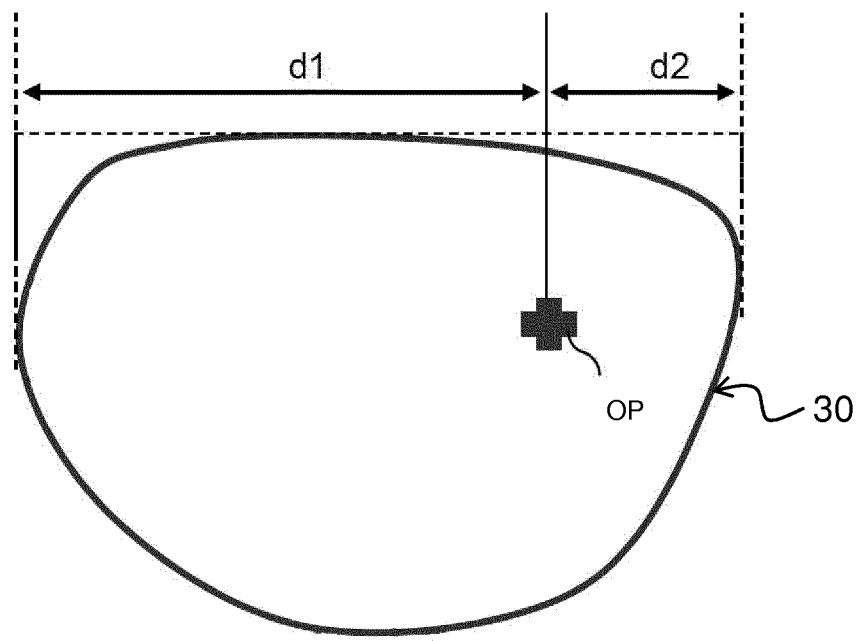

For example as illustrated on FIG. 1, in the case where the frame on which the optical lens 30 is to be mounted is shaped such that the nasal (d2) and temporal (d1) distances, respectively defining the distance between the optical reference point OP and the nasal and temporal edges, are dissymmetric, a lens blank having a significantly larger diameter is required in order to be of sufficient size to enable an optical lens of the required size to be obtained.

This leads to wastage of the optical material of the optical lens blank.

Furthermore, the manufacturing process is more and more complex, in particular the need to introduce manufacturing prism when machining the surfaces of the lens may require using specific machining devices. Therefore, the greater the machining prism to be used is the more complex the machining process become. Great machining prism may require to change the machining device so as to be able to proceed with the manufacturing, increasing the manufacturing cost.

Therefore, it appears that there is a need to for a method for optimizing the position of an optical lens to be manufactured in the lens blank used to manufacture said optical lens.

To this end, the invention proposes a method, for example implemented by computer means, for optimizing the position of an optical lens to be manufactured in a lens blank, the optical lens being manufactured by machining at least two surfaces of the lens blank, with the lens blank comprising a first blank surface and a second blank surface linked by a peripheral blank surface and having an axis of symmetry,
the optical lens comprising:
a first optical surface obtained by machining the first blank surface while having the lens blank blocked on the second blank surface, said first optical surface being bounded by a first closed contour,
a second optical surface obtained by machining the second blank surface while having the lens blank blocked in the first optical surface, said second optical surface being bounded by a second closed contour, and
an optical axis intercepting said first and second surface,
the method comprising:
 a lens blank data providing step during which lens blank data relating to the first, second and peripheral blank surfaces are provided,
 an optical lens data providing step during which optical lens data relating to the first, second and peripheral optical surfaces are provided,
 a positioning step during which the optical lens is virtually positioned in the lens blank in a position so that at least one of the first optical surface or the second optical surface is included within said lens blank,
 an evaluation step during which a manufacturing prism cost function is evaluated, the machining prism cost function corresponding to a weighed sum of the first manufacturing prism to be used when blocking the lens blank on the second surface to machine the first optical surface and of the second manufacturing prism to be used when blocking the lens blank on the first optical surface to machine the second optical surface,
wherein the positioning step and the evaluation step are repeated so as to minimize the manufacturing prism cost function.

Advantageously, the method according to the invention allows optimizing the position of the optical lens in the optical lens blank so as to minimize the amount of manufacturing prism to be used when blocking the lens blank to manufacture the optical lens. Therefore, the method according to the invention allows reducing the overall manufacturing prism and thus simplifying the manufacturing process and reducing the manufacturing costs.

According to further embodiments which can be considered alone or in combination:
 during the positioning step the optical lens is virtually positioned in the lens blank so that the axis of symmetry of the lens blank intersects the first optical center of the first optical surface; and/or
 during the positioning step the optical lens is virtually positioned in the lens blank so that the smallest distance between the first optical surface and the first blank surface is greater than a first predetermined value; and/or
 during the positioning step the optical lens is virtually positioned in the lens blank so that the axis of symmetry of the lens blank intersects the barycenter of the optical lens; and/or during the positioning step the optical lens is virtually positioned in the lens blank so as to minimize the angle between the line perpendicular to the second optical surface at an intersection point of the axis of symmetry of the lens blank with the second surface; and/or during the positioning step the optical lens is virtually positioned in the lens blank so that a line joining the most distant points of the first contour is comprised in a plane orthogonal to the minor axis of the contour of the blank peripheral surface; and/or during the positioning step the optical lens is virtually positioned in the lens blank so that the smallest distance between the second optical surface and the second blank surface is greater than a second predetermined value; and/or during each positioning step the optical lens is positioned so as to minimize the volume of the optical lens that is not included in the lens blank; and/or during each positioning step the optical lens is positioned so as to minimize the variance of the distances between points of the first optical surface and points of the first blank surface and/or so as to minimize the variance of the distances between points of the second optical surface and points of the second blank surface; and/or the first contour or the second contour corresponds to the inner contour of a selected spectacle frame in which the optical lens is to be mounted; and/or the optical lens is to be mounted in a spectacle frame and during the positioning step the optical lens is virtually positioned in the lens blank so as to minimize the volume of the optical lens in the nasal part of the optical lens that is not included in the lens blank.

The invention further relates to a method implemented by computer means, for selecting a lens blank to be used to manufacture an optical lens, the method comprising:
  a lens blank set providing step during which a set of at least two lens blanks is provided,
  a positioning step during which the position of the optical lens to be manufactured in each lens blank of the set of lens blanks is determined according to the invention,
  a selection step during which the lens blank providing the smallest manufacturing prism cost function is selected.

The invention also relates to a method of manufacturing an optical lens, comprising:
  a lens blank providing step, during which a lens blank comprising a first blank surface and a second blank surface linked by a peripheral blank surface and having an axis of symmetry is provided,
  a first blocking step, during which the lens blank is blocked on the second blank surface,
  a first machining step during which the first blank surface is machined so as to obtain the first optical surface of the optical lens,
  a second blocking step, during which the lens blank is blocked on the first optical surface,
  a second machining step during which the second blank surface is machined so as to obtain the second optical surface of the optical lens,
wherein the blocking position of the lens blank during the first and second blocking step are determined based on a virtual position of the optical lens in the lens blank determined using a method according to the invention.

According to a further aspect, the invention relates to a computer program product comprising one or more stored sequences of instructions that are accessible to a processor and which, when executed by the processor, causes the processor to carry out the steps of the method according to the invention.

The invention further relates to a computer readable medium carrying one or more sequences of instructions of the computer program product according to the invention.

Furthermore, the invention relates to a program which makes a computer execute the method of the invention.

The invention also relates to a computer-readable storage medium having a program recorded thereon; where the program makes the computer execute the method of the invention.

The invention further relates to a device comprising a processor adapted to store one or more sequence of instructions and to carry out at least one of the steps of the method according to the invention.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or a Field Programmable Gate Array ("FPGA") or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Figure 4:
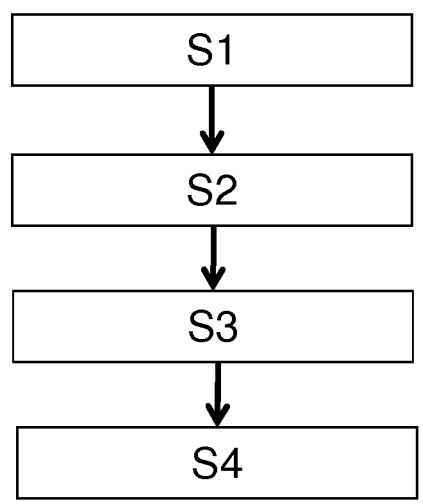

Other features and advantages of the present invention will become apparent from the following description of non-limitative embodiments, with reference to the attached drawing in which:
  FIG. 1 is a schematic planar view of an edged optical lens,
  FIG. 2 illustrates a reference frame of a lens blank,
  FIG. 3 illustrates a reference frame of an optical lens,
  FIG. 4 is a flowchart of different steps of a method of determining a lens blank according to the invention, and FIGS. 5a to 5d represents different positions of an optical lens in a lens blank.

The present invention relates to a method, for example implemented by computer means, for optimizing the position of an optical lens to be manufactured in a lens blank, the optical lens being manufactured by machining at least two surfaces of the lens blank.

The lens blank is a block of material, such as transparent plastic or glass, that is to be machined so as to obtain an optical lens.

An example of lens blank is represented on FIG. 2. As represented on FIG. 2, the lens blank 20 has a first blank surface 22 and a second blank surface 24 opposed to the front surface 22. The lens blank further comprises a peripheral blank surface 26 linking the first and second blank surfaces. Furthermore, the lens blank has an axis of symmetry.

The lens blank may comprise a reference frame defined by an orthonormal basis $R_b$ having a center point $O_b$ and defined by three vectors (xb, yb, zb). Typically, the center point $O_b$ is on the first surface 22 of the lens blank at the geometrical center of the contour of the first blank surface 22. The vector $z_b$ is defined as perpendicular to the surface of the first blank surface at the center point $O_b$.

Typically, the first and second blank surfaces are spherical whose apex is on the axis (Ob, zb). This facilitates obtaining the lens blank by molding.

The first and second blank surfaces may also be oriented planes (xb, yb). This is the case of a lens blank obtained by cutting a block of optical material, such as a plate or a bar.

The peripheral edge surface may be a cylindrical sheet whose generatrix can be conventionally oriented along the axis (Ob, zb) whose directrix curve and a closed curve is described in the plane (Ob, xb, yb). Generally, the peripheral edge surface is a cylinder of revolution. Typically, the peripheral edge has an elliptic or circular contour.

However, the peripheral edge surface may take more complex forms to meet the needs of positioning or holding the lens blank during machining operations.

For example, the peripheral edge surface may have rectangular contour. In this case, the crude is a parallelepiped.

Typically, the first and second blank surfaces of the lens blank are machined so as to obtain an optical lens.

The term "optical lens" is to be understood to mean any type of known lens intended to be supported by a wearer's face. The term can refer to ophthalmic lenses such as non-corrective lenses, semi-finished lens blanks and corrective lenses, such as progressive addition lenses, unifocal or multifocal lenses. The term can also refer to said ophthalmic lenses which could present at least one added value such as, for example, tint, polarization filtering, electrochromism, antireflective properties, anti-scratch properties or comprise a photochromic unit or a light guide unit, . . .

The term "spectacle lens" refers to an optical lens edged so as to be fitted in a spectacle frame.

As represented on FIG. 3, an optical lens 30 comprises a first optical surface 32 opposed to a second optical surface 34, the first and second optical surfaces are linked by a peripheral optical surface 36.

The first optical surface 32 is obtained by machining the first blank surface 22 while having the lens blank 20 blocked on the second blank surface 24. The first optical surface being bounded by a first closed contour C1.

The second optical surface 34 is obtained by machining the second blank surface 24 while having the lens blank blocked in the first optical surface 32. The second optical surface 34 being bounded by a second closed contour C2.

The optical lens 30 further comprises an optical axis intercepting the first and second optical surfaces.

As for the lens blank 20, the optical lens 30 comprises a reference frame that may be defined on the first optical surface 32 by an orthonormal basis $R_1$ having a center point $O_1$ and defined by three vectors ($x_1$, $y_1$, $z_1$).

Typically, the center point $O_1$ of the orthonormal basis may be placed at an optical reference point of one of the surfaces of the optical lens, for example on the front surface of the optical lens.

The optical reference point, often referred to as the optical centre, is defined from the point of an intersection of the primary gaze position, coincident with a pupil position of a wearer, and the front surface of the optical lens when mounted on a frame worn by the wearer.

For example, the position of the lens with relation to the eye of the wearer, may be defined with the fitting cross intersecting the primary viewing direction, a distance between the center of rotation of the eye and the first major surface of the lens of 25.5 mm, a pantoscopic angle of 8° and a wrap angle of 0°.

In the case where the optical lens includes a prism, the optical reference point defines the point on the front surface of the optical lens at which the prismatic effect of the finished optical lens is determined. Such a reference point is often referred to as the prism reference point (PRP).

The "optical reference point" is located at the same position as the fitting cross when the optical lens is a unifocal lens.

The "optical reference point" is determined from the position of the fitting cross, for example the optical reference point is located 4 mm below the fitting cross and spaced 2.5 mm laterally on the nasal side of the lens, when the lens is progressive addition lens.

The vector $z_1$ is defined as perpendicular to the surface of the front face at the center point $O_1$.

The rear surface may also comprise an orthonormal basis generally having the same vector $z_1$ as the front surface and being tangent to the rear surface.

The peripheral optical surface 36 may be a cylindrical sheet whose generatrix can be conventionally oriented along the axis ($O_1$, $z_1$) whose directrix curve and a closed curve is described in the plane ($O_1$, $x_1$, $y_1$). Generally, the peripheral edge surface is a cylinder of revolution.

Alternatively the peripheral edge surface may correspond to the contour of the spectacle frame in which the optical lens is to be mounted.

As illustrated on FIG. 4, the method for optimizing the position of an optical lens to be manufactured in a lens blank, comprises:
 a lens blank data providing step S1,
 an optical lens data providing step S2,
 a positioning step S3, and
 an evaluation step S4.

The positioning and evaluation steps are repeated so as to minimize the manufacturing prism to be used when manufacturing the optical lens from the lens blank.

During the lens blank data providing step S1, lens blank data relating to the first, second and peripheral blank surfaces are provided.

Optical lens data relating to the first, second and peripheral optical surfaces are provided during the optical lens data providing step S2.

During the positioning step S3, the optical lens is virtually positioned in the lens blank in a position so that at least one of the first optical surface or the second optical surface is included within the lens blank.

Virtually positioning the lens in the lens blank comprises determining three translation parameters (Tx, Ty, Tz) determining the position of a reference point of the optical lens, for example the center of the orthonormal basis $R_1$ of the optical lens, in the orthonormal basis $R_b$ of the lens blank and the three rotation parameters (Rx, Ry, Rz) determining the orientation of the orthonormal basis $R_1$ of the optical lens in the orthonormal basis $R_b$ of the lens blank.

During the evaluation step S4, a manufacturing prism cost function is evaluated. The machining prism cost function corresponding to a weighted sum of the first manufacturing prism to be used when blocking the lens blank on the second surface to machine the first optical surface and of the second manufacturing prism to be used when blocking the lens blank on the first optical surface to machine the second optical surface.

The positioning and evaluation steps are repeated so as to minimize the manufacturing prism cost function.

Therefore the method according to the invention allows determining a position of the optical lens in the lens blank that minimizes the manufacturing prism to be used when blocking the lens blank during the manufacturing process.

An example of positioning step is detailed with reference to FIGS. 5a to 5d.

Figure 5A:
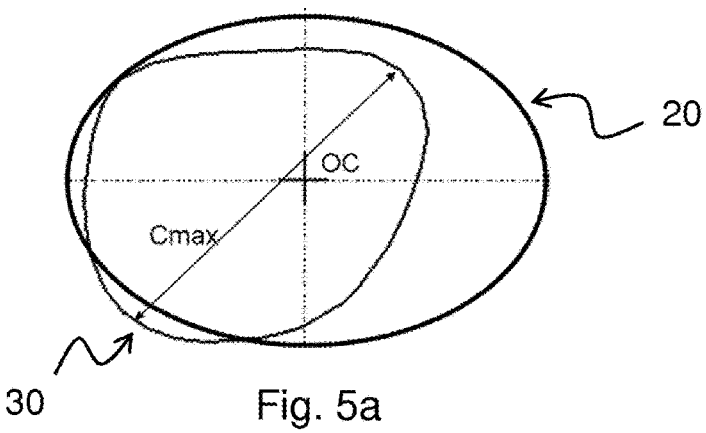

As illustrated on FIG. 5a in an initial position, the contour of the optical lens may not fit within the contour of the lens blank.

Therefore the positioning parameters Rz, Tx and Ty are to be determined so as to have the contour of the optical lens fit in the contour of the optical lens.

Typically, the optical lens is positioned so that the major axe of the contour of the optical lens is parallel to the major axe of the contour of the lens blank. The major axe is the line joining the two most distant points of the contour of the optical lens and the lens blank respectively.

According to an embodiment of the invention, the optical lens is virtually positioned in the lens blank so that a line joining the most distant points of the first contour is comprised in a plane orthogonal to the minor axis of the contour of the blank peripheral surface.

Figure 5B:
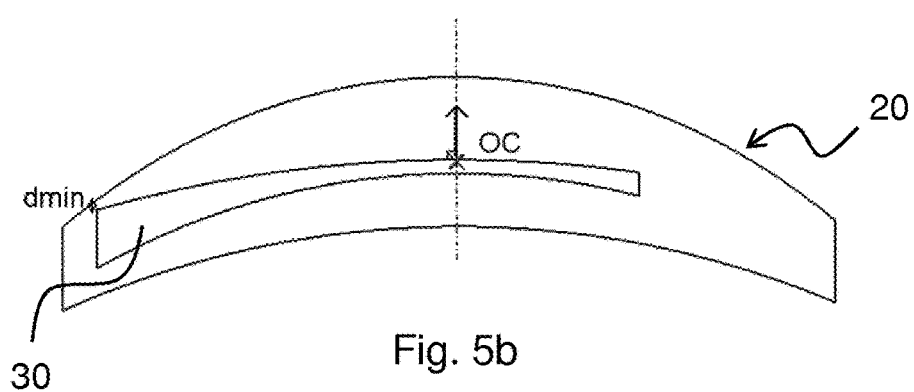

As illustrated on FIG. 5b, the position parameters Tx and Ty may be determined so as to have the axis of symmetry A of the lens blank intersects the first optical center OC of the first optical surface 32 of the optical lens 30. Typically, the position of the first optical center OC in the plane (Ob, xb, yb) of the orthonormal basis $R_b$ of the lens blank is determined so as to have the axis of symmetry of the lens blank A intersects the first optical center OC.

Furthermore, the position parameters Rx and Ry may be determined so to have the normal to the first surface at the geometrical center of the first closed contour parallel to the axis of symmetry A of the lens blank.

As illustrated on FIG. 5b, the position parameter Tz may be determined so that the smallest distance dmin between the first optical surface and the first blank surface is greater than a first predetermined value. Typically, so as to obtain a uniform surfacing upon the surfacing step of the machining process the inventors have determined that the first predetermined value should be of about 0.5 mm.

Typically, elements to consider when determining such minimum distance are:
the "minimum chips" (the minimum amount of material to ensure not to change cutting mode when machining)
the tolerances of fabrication of the lens blank,
the uncertainties of position when positioning the lens blank on the machining device, and
the uncertainties when adjusting the machine tool.

Figure 5C:
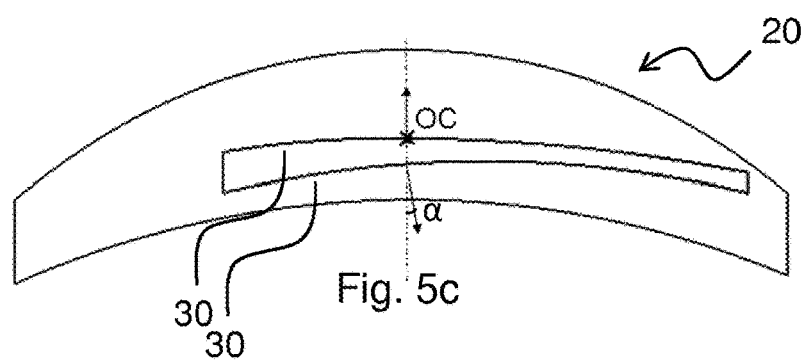

As illustrated on FIG. 5c, the positioning of the optical lens in the lens blank considering solely the first optical surface may lead to having a manufacturing prism to be applied when machining the second that is very large.

Therefore, during the positioning step the position parameters may be determined considering the second optical surface.

Figure 5D:
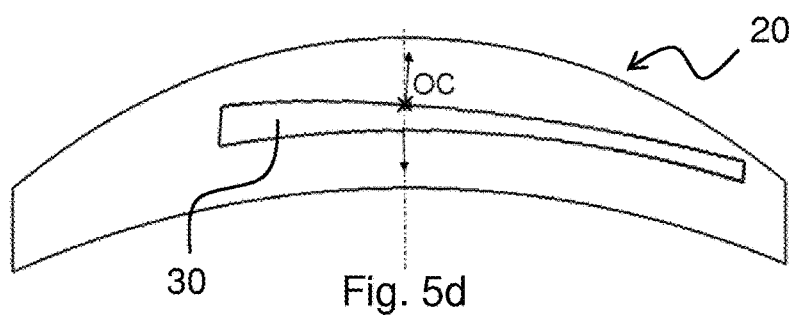

As illustrated on FIG. 5d, the positioning parameters Rx, Ry, Tx and Ty are determined so as to so as to minimize the angle between the line perpendicular to the second optical surface at an intersection point of the axis of symmetry of the lens blank with the second surface.

Furthermore, after having manufactured the first surface, the opposite face of the obtained semi-finished optical lens has to be manufactured. Therefore the semi-finished optical lens has to be rigid enough to withstand the blocking step (locking and clamping clip) without irreversible deformation.

The temptation to avoid the risks associated with the machining over-thickness is to have the optical lens at even distance between both faces of the lens blank. However, one has observed that this may lead to a semi-finished too thin thus lacking rigidity.

Therefore, according to an embodiment of the invention, the optical lens is virtually positioned in the lens blank, i.e. the position parameter Tz is determined, so that the smallest distance between the second optical surface and the second blank surface is greater than a second predetermined value.

One has observed that having a second predetermined value greater than or equal to 4 mm provides good results.

Further parameters may be considered when virtually positioning the optical lens in the lens blank.

Typically, during the positioning step the optical lens is virtually positioned in the lens blank so as to minimize the volume of the optical lens that is not included in the lens blank.

Furthermore, the optical lens is virtually positioned in the optical lens blank so as to minimize the variance of the distances between points of the first optical surface and points of the first blank surface and/or so as to minimize the variance of the distances between points of the second optical surface and points of the second blank surface.

Thus making the machining step easier to implement and therefore reducing the cost of the overall manufacturing process.

According to an embodiment of the invention, the optical lens is to be mounted in a spectacle frame and the first contour or the second contour corresponds to the inner contour of a selected spectacle frame in which the optical lens is to be mounted.

According to such embodiment and to assure a good visual conformity to the wearer, during the positioning step, the optical lens is virtually positioned in the lens blank so as to minimize the volume of the optical lens in the nasal part of the optical lens that is not included in the lens blank.

The invention may further relate to a method, for example implemented by computer means, for selecting a lens blank to be used to manufacture an optical lens.

The method comprises:
a lens blank set providing step during which a set of at least two lens blanks is provided,
a positioning step during which the position of the optical lens to be manufactured in each lens blank of the set of lens blanks is determined,
a selection step during which the lens blank providing the smallest manufacturing prism cost function is selected.

Typically, during the positioning step an optimized position is determined according to the method of the invention so as to reduce the manufacturing prism to be used.

The invention further relates to method of manufacturing an optical lens, comprising:
- a lens blank providing step, during which a lens blank comprising a first blank surface and a second blank surface linked by a peripheral blank surface and having an axis of symmetry is provided,
- a first blocking step, during which the lens blank is blocked on the second blank surface,
- a first machining step during which the first blank surface is machined so as to obtain the first optical surface of the optical lens,
- a second blocking step, during which the lens blank is blocked on the first optical surface,
- a second machining step during which the second blank surface is machined so as to obtain the second optical surface of the optical lens, wherein the blocking position of the lens blank during the first and second blocking step are determined based on a virtual position of the optical lens in the lens blank determined using a method according to the invention.

Advantageously, the lens blank provided during the lens blank providing step may have been selected using the method for selecting a lens blank according to the invention.

Furthermore, the lens blank may be provided from a selection of a lens blank in a set of existing lens blanks.

Typically, the lens manufacturer may have a set of lens blanks that he may use to manufacture a given optical lens. The features, geometry, dimensions, material etc. of each lens blank are considered during the lens blank determining step and the most appropriate lens blank in the set of lens blanks is selected. Features of the manufacturing process to be used when manufacturing the optical lens may also be considered when determining the most appropriate lens blank.

Further to the determination of the most appropriate lens blank, the lens manufacturer may pick the lens blank and manufacture the optical lens, for example using the identified manufacturing process.

The lens blank providing step of the invention may further comprise cutting a block of optical material so as to obtain the determined lens blank. The block of optical material may be one of: a bar or a plate.

For example, a bar of material, having sufficient diameter size so as to include the virtual volume, may be cut so that the thickness is adjusted to the minimum thickness including the virtual volume. Bars differing in diameter size can also be used, and the bar having a diameter just greater or equal to the diameter of the virtual volume may be selected.

As another example, it is possible to use different plates having different thickness and select the plate having the thickness just greater or equal to the virtual volume thickness. Then, the selected plate is cut so as to include the virtual volume.

According to a further embodiment of the invention, the lens blank providing step of the invention may further comprise manufacturing the lens blank, for example by machining a standard lens blank. The manufacturing of the lens blank may comprise additive manufacturing.

The method according to the invention may further comprise lens blank information providing step during which information concerning the determined lens blank are sent to the manufacturing unit and may be taken into account to adjust the manufacturing parameters.

The invention has been described above with the aid of embodiments without limitation of the general inventive concept as defined in the claims.

Many modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method implemented by computer means for optimizing the position of an optical lens to be manufactured in a lens blank, the optical lens being manufactured by machining at least two surfaces of the lens blank, with
   the lens blank comprising a first blank surface and a second blank surface linked by a peripheral blank surface and having an axis of symmetry,
   the optical lens comprising:
   - a first optical surface obtained by machining the first blank surface while having the lens blank blocked on the second blank surface, said first optical surface being bounded by a first closed contour,
   - a second optical surface obtained by machining the second blank surface while having the lens blank blocked in the first optical surface, said second optical surface being bounded by a second closed contour, and
   - an optical axis intercepting said first and second surface, the method comprising :
   - a lens blank data providing step during which lens blank data relating to the first, second and peripheral blank surfaces are provided,
   - an optical lens data providing step during which optical lens data relating to the first, second and peripheral optical surfaces are provided,
   - a positioning step during which the optical lens is virtually positioned in the lens blank in a position so that at least one of the first optical surface or the second optical surface is included within said lens blank,
   - an evaluation step during which a manufacturing prism cost function is evaluated, the manufacturing prism cost function corresponding to a weighed sum of a first manufacturing prism to be used when blocking the lens blank on the second surface to machine the first optical surface and of a second manufacturing prism to be used when blocking the lens blank on the first optical surface to machine the second optical surface,
      wherein the positioning step and the evaluation step are repeated so as to minimize the manufacturing prism cost function.

2. The method according to claim 1, wherein during the positioning step the optical lens is virtually positioned in the lens blank so that the axis of symmetry of the lens blank intersects the first optical center of the first optical surface.

3. The method according to claim 1, wherein during the positioning step the optical lens is virtually positioned in the lens blank so that the smallest distance between the first optical surface and the first blank surface is greater than a first predetermined value.

4. The method according to claim 1, wherein during the positioning step the optical lens is virtually positioned in the lens blank so that the axis of symmetry of the lens blank intersects the barycenter of the optical lens.

5. The method according to claim 1, wherein during the positioning step the optical lens is virtually positioned in the lens blank so as to minimize the angle between the line perpendicular to the second optical surface at an intersection point of the axis of symmetry of the lens blank with the second surface.

6. The method according to claim 1, wherein during the positioning step the optical lens is virtually positioned in the lens blank so that a line joining the most distant points of the first contour is comprised in a plane orthogonal to the minor axis of the contour of the blank peripheral surface.

7. The method according to claim 1, wherein during the positioning step the optical lens is virtually positioned in the lens blank so that the smallest distance between the second optical surface and the second blank surface is greater than a second predetermined value.

8. The method according to claim 1, wherein during the positioning step the optical lens is virtually positioned in the lens blank so as to minimize the volume of the optical lens that is not included in the lens blank.

9. The method according to claim 1, wherein during the positioning step the optical lens is positioned so as to minimize the variance of the distances between points of the first optical surface and points of the first blank surface and/or so as to minimize the variance of the distances between points of the second optical surface and points of the second blank surface.

10. The method according to claim 1 wherein the first contour or the second contour corresponds to the inner contour of a selected spectacle frame in which the optical lens is to be mounted.

11. The method according to claim 1, wherein the optical lens is to be mounted in a spectacle frame and during the positioning step the optical lens is virtually positioned in the lens blank so as to minimize the volume of the optical lens in the nasal part of the optical lens that is not included in the lens blank.

12. A method implemented by computer means, for selecting a lens blank to be used to manufacture an optical lens, the method comprising:
a lens blank set providing step during which a set of at least two lens blanks is provided,
a positioning step during which the position of the optical lens to be manufactured in each lens blank of the set of lens blanks is determined according to claim 1,
a selection step during which the lens blank providing the smallest manufacturing prism cost function is selected.

13. A method of manufacturing an optical lens, comprising:
a lens blank providing step, during which a lens blank comprising a first blank surface and a second blank surface linked by a peripheral blank surface and having an axis of symmetry is provided,
a first blocking step, during which the lens blank is blocked on the second blank surface,
a first machining step during which the first blank surface is machined so as to obtain the first optical surface of the optical lens,
a second blocking step, during which the lens blank is blocked on the first optical surface,
a second machining step during which the second blank surface is machined so as to obtain the second optical surface of the optical lens,
wherein the blocking position of the lens blank during the first and second blocking step are determined based on a virtual position of the optical lens in the lens blank determined using a method according to claim 1.

14. A non-transitory computer-readable medium on which is stored one or more sequences of instructions that are accessible to a processor and which, when executed by the processor, causes the processor to carry out at the steps of the method according to claim 1.

15. The method according to claim 2, wherein during the positioning step the optical lens is virtually positioned in the lens blank so that the smallest distance between the first optical surface and the first blank surface is greater than a first predetermined value.

16. The method according to claim 2, wherein during the positioning step the optical lens is virtually positioned in the lens blank so that the axis of symmetry of the lens blank intersects the barycenter of the optical lens.

17. The method according to claim 3, wherein during the positioning step the optical lens is virtually positioned in the lens blank so that the axis of symmetry of the lens blank intersects the barycenter of the optical lens.

18. The method according to claim 2, wherein during the positioning step the optical lens is virtually positioned in the lens blank so as to minimize the angle between the line perpendicular to the second optical surface at an intersection point of the axis of symmetry of the lens blank with the second surface.

19. The method according to claim 3, wherein during the positioning step the optical lens is virtually positioned in the lens blank so as to minimize the angle between the line perpendicular to the second optical surface at an intersection point of the axis of symmetry of the lens blank with the second surface.

20. The method according to claim 4, wherein during the positioning step the optical lens is virtually positioned in the lens blank so as to minimize the angle between the line perpendicular to the second optical surface at an intersection point of the axis of symmetry of the lens blank with the second surface.

* * * * *